United States Patent [19]

Francis

[11] Patent Number: 4,926,348
[45] Date of Patent: May 15, 1990

[54] PLOTTING APPARATUS USING A LIGHT SOURCE MOVED ON A PHOTOSENSITIVE SURFACE

[75] Inventor: Philip S. Francis, Fitzroy, Australia

[73] Assignee: Royal Melbourne Institute of Technology Limited, Melbourne, Australia

[21] Appl. No.: 128,984

[22] Filed: Dec. 4, 1987

[30] Foreign Application Priority Data

Dec. 5, 1986 [AU] Australia .............................. PH9355

[51] Int. Cl.$^5$ ........................ G06K 15/12; G06F 3/13; G03B 41/00
[52] U.S. Cl. ................................. 364/520; 346/107 R; 354/4
[58] Field of Search ........................ 362/800; 357/17; 350/96.13; 364/489, 523, 520, 488, 491; 354/4; 346/33 A, 150, 107 R

[56] References Cited

U.S. PATENT DOCUMENTS

| | | | |
|---|---|---|---|
| 3,780,357 | 12/1973 | Haitz | 357/17 |
| 3,881,098 | 4/1975 | Rich | 364/520 |
| 3,930,251 | 12/1975 | Sajava et al. | 364/523 |
| 4,485,387 | 11/1984 | Drumheller | 364/489 |
| 4,563,747 | 1/1986 | Tidd | 364/523 |
| 4,620,200 | 10/1986 | Fukai | 354/4 |
| 4,809,028 | 2/1989 | Gagnon | 346/108 |

FOREIGN PATENT DOCUMENTS 554969 7/1982 Australia .

Primary Examiner—Gary V. Harkcom
Assistant Examiner—Raymond J. Bayerl
Attorney, Agent, or Firm—Irell & Manella

[57] ABSTRACT

A plotting implement for creating a record on a photosensitive surface. The plotting implement includes a contact tip for contacting and for moving between different positions on the surface, the contact tip in use constituting an electromagnetic radiation source located at the surface, whereby the radiation source at the tip exposes points and/or lines of contact of the tip with the surface. The contact tip has a radiation aperture of a predetermined diameter to expose lines of a width equal to that diameter. An optic fibre of the required diameter may extend from an electromagnetic radiation source and terminate at the aperture. Alternatively the electromagnetic radiation source may comprise a light emitting diode (LED) having a transparent body tapering from the source of light towards the tip, the tapering body being surrounded by opaque material and being truncated before reaching a point to provide a tip of the transparent body of the predetermined diameter. The specification also describes a plotting apparatus including a plotting implement, mounted so as to bring the contact tip into contact with the surface and driven so as to control the relative movement of the plotting implement by an associated computer.

3 Claims, 1 Drawing Sheet

U.S. Patent  May 15, 1990  4,926,348
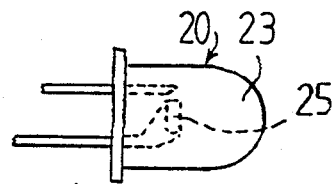
(Prior Art) FIG. 1
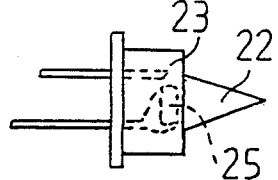
FIG. 2
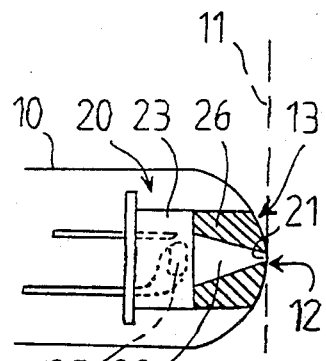
FIG. 3
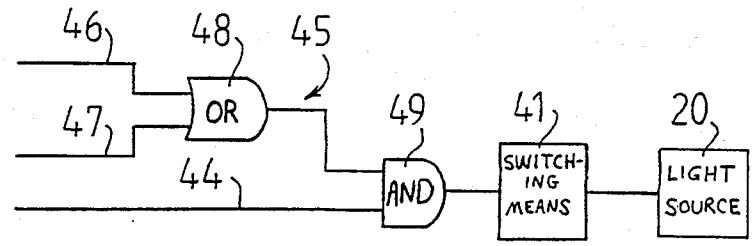
FIG. 4
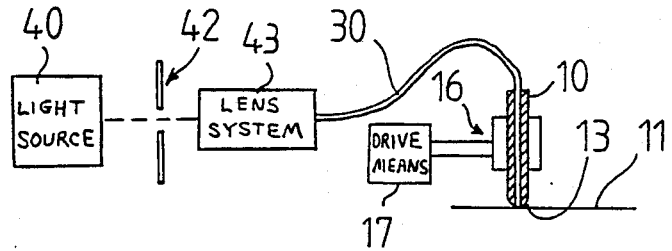
FIG. 5

PLOTTING APPARATUS USING A LIGHT SOURCE MOVED ON A PHOTOSENSITIVE SURFACE

This invention relates to plotting implements and plotting apparatus for creating records on surfaces.

Plotting apparatus presently used for computer controlled drawing or drafting uses a pen which is moved over a drawing surface. The movement of the pen is effected by means of motors which control the X and Y directions of movement under computer control. Also the pen can be selectively lifted from the paper to enable repositioning for commencing further lines.

This apparatus is used, say for plotting the output of a CAD program. e.g. for designing printed circuit arrangements. The drawing produced is photographed, sometimes at a reduced scale, to produce a suitable negative. This negative is then used for exposing the photoresist layer on a P.C. board preparatory to creation of the conductor paths on the P.C. board. It will be seen that this is effectively a two step process, the first step being the plotting of the layout and second being the photographic process.

In Australian Patent Specification No. 554,969 there is proposed the use of a light pen having a light source and aligned source and exit apertures to produce a substantially non-divergent beam of light for exposing a photosensitive sheet. The pen is held in the pen raised position by a computer driven plotter. Disadvantages of this proposed implement include relative complexity of the implement due to the need for collimating apertures, inefficient use of the light output of the light source, and, most importantly, difficulty of maintaining the required width of line on the photosensitive surface due to some unavoidable divergence of the beam, slight tilting of the implement, or buckling of the photosensitive surface.

It is an object of the present invention to provide a simple and effective plotting implement suitable for creating a record directly on a radiation sensitive surface.

It is a further object to provide plotting apparatus for effectively creating a record on a radiation sensitive surface.

According to the present invention there is provided a plotting implement for creating a record on a surface, the surface being radiation sensitive so that portions of the surface exposed to a predetermined type and intensity of radiation undergo a change thereby creating a record of those exposed portions, the plotting implement including a contact tip for contacting and for moving between different positions on the surface, the contact tip in use constituting a radiation source located at the surface, whereby the radiation source at the tip exposes portions of the surface being points and/or lines of contact of the tip with the surface.

In the preferred embodiment the radiation sensitive surface is a photosensitive surface sensitive to electromagnetic radiation and the radiation source comprises a source of electromagnetic radiation. In this case the contact tip preferably includes a radiation aperture of a predetermined diameter, the aperture being located at the tip so as to be located in use at the surface, the aperture in use passing radiation so as to thereby constitute a radiation source of the predetermined diameter at the surface and creating exposed surface portions of a width equal to the predetermined diameter.

In one possible embodiment the implement further includes an optic fibre extending in use from an electromagnetic radiation source so as to transmit radiation therefrom, the optic fibre terminating at the aperture so as to emit electromagnetic radiation from the aperture. The end of the optic fibre through which radiation is emitted may constitute the aperture, the optic fibre having a diameter equal to the predetermined diameter.

In an alternative embodiment the radiation source comprises an electromagnetic radiation source located within the implement, and a light path within the implement for passing radiation from the source to the aperture, the light path being surrounded by an opaque material The electromagnetic radiation source may comprise an LED. the LED having a transparent body for passing radiation from the PN junction of the LED to the aperture, the body tapering from the PN junction towards the tip, the tapering body being surrounded by opaque material and the transparent body being truncated before reaching a point to provide a tip of the transparent body of the predetermined diameter.

Preferably the contact tip of the implement has a smooth convex shape to promote smooth relative travel of the tip on the surface.

The present invention also provides a plotting apparatus for creating a record on a surface, the surface being radiation sensitive, the apparatus including a plotting implement as described above, mounting means for mounting the plotting implement so as to bring the contact tip into contact with the surface in use, the plotting apparatus further including drive means for controlling relative movement of the plotting implement under control of an associate computer and for moving the contact tip to the points and along the lines to be comprised in the record to be produced.

Switching means may be provided for selectively discontinuing exposure of the surface to radiation, the switching means being operated under the control of the associated computer. The plotting apparatus may comprise a digital XY plotter having a pen holder which in use mounts the plotting implement, the pen holder being normally movable between an operative pen down position and an inoperative pen raised position, movement of the pen holder between the inoperative and operative positions normally occurring in response to a pen down signal, the switching means of the plotting apparatus being responsive to the pen down signal to turn on the radiation source.

The switching means may include exposure control means for controlling the intensity of radiation from the radiation source, the intensity having a relatively high value during relatively high speed movement of the implement on the surface and vice versa so as to thereby achieve substantial uniformity of exposure of the surface.

Possible and preferred features of the present invention will now be described with particular reference to the accompanying drawings. However it is to be understood that the features illustrated in and described with reference to the drawings are not to be construed as limiting on the scope of the invention. In the drawings:

FIG. 1 is a side view of a conventional LED,

FIG. 2 is a side view of an LED having its body shaped to produce a conical light path, FIG. 3 is a side view of an LED arranged to function as the light source and contact tip of a plotting implement, FIG. 4 is a circuit diagram of switching means for use in plotting apparatus according to the present invention.

FIG. 5 is a schematic view of a plotting apparatus according to the present invention in which a remote light source and shutter mechanism is used to "switch" the virtual source at the implement tip.

The plotting implement 10 according to the present invention is for creating a record on a surface 11, the surface 11 being radiation sensitive so that there is created a record of surface portions exposed to radiation from a radiation source 12. The plotting implement 10 includes a contact tip 13 for contacting and moving along the radiation sensitive surface 11. The radiation sensitive surface is associated with the contact tip 13 such that an actual or virtual radiation source 12 is provided at the tip 13 so as to expose points and/or lines of contact of the tip 13 with the surface 11.

The plotting apparatus includes a plotting implement 10 and mounting means 16 for mounting the plotting implement 10 so as to maintain the contact tip 13 in contact with the radiation sensitive surface 11, the plotting apparatus further including drive means 17 for controlling movement of the plotting implement 10 and for moving the contact tip 13 to the points and along the lines to be exposed to radiation.

The radiation sensitive surface 11 is a photosensitive surface so as to be sensitive to electromagnetic radiation. The surface 11 may be provided by a photographic or litho film or the like. Alternatively the radiation sensitive surface 11 may be provided by a photoresist layer, e.g. on a P.C. board onto which a conductor path layout is to be directly produced. The photosensitive surface 11 is preferably a high contrast surface so that sharp images of the points and paths of tip travel are produced.

Preferably the surface 11 is sensitive to a single electromagnetic radiation wavelength or to a narrow band of wavelengths and the radiation source 12 is operative to produce radiation at that wavelength or wavelength band. Preferably the wavelength is chosen so that normal handling of the radiation sensitive surface 11 is possible e.g. under normal room fluorescent lighting or under red safe-light conditions. For this purpose the radiation sensitive surface 11 may comprise orthochromatic high contrast film, e.g. sensitive particularly to green light.

The radiation source 12 may comprise a light emitting diode (LED) 20 (FIG. 3), laser diode, mercury lamp or other source or an optic fibre extending from the source and terminating at the contact tip 13. In the case where circuit conductor paths for P.C. boards are being produced, the standard width of such a conductor is twelve thousandths of an inch and therefore the diameter of the optic fibre 30 is preferably twelve thousandths of an inch so that that diameter of exposed line will be produced as the contact tip 13 moves along the radiation sensitive surface 11.

In FIG. 3 the radiation source comprises an LED 20 together with an appropriate aperture 21 to produce the desired diameter of emergent light. There is provided a light path 22 within the LED body 23, the light path 22 terminating at an aperture 21 of the desired diameter, the aperture 21 being located at the contact tip 13 of the implement 10. The light path 22 is defined by the LED body 23 of transparent material to pass light from the PN junction 25 of the LED 20 to the aperture 21 at the tip 13, the light path 22 being surrounded by opaque material 26 to prevent emergence of light from the PN junction 25 other through the aperture 21. The light path 22 as shown in FIG. 2 is provided by a tapering or generally conical body of transparent material narrowing in diameter away from the PN junction 25. This may be constructed by turning an LED body 23 to the required shape using a lathe. The opaque body 26 surrounding the light path 22 may comprise a settable resin material filled with an opaque material such as black photocopying toner particles. The body of opaque material 26 may then be machined or polished back to expose the tip of the conical transparent material 22, further polishing achieving widening of the aperture 21 formed by the tip of the transparent cone, this process being continued until the desired diameter of the aperture 21 is achieved.

The contact tip 13 of the implement 10 is rounded to a smooth convex shape (FIG. 3) to promote smooth travel of the tip 13 on the light sensitive surface 11. This rounding of the tip 13 is also effective to achieve a reduction in sensitivity of the diameter of the radiation emergent from the tip 13 to tilt of the implement 10.

The plotting apparatus of the preferred embodiment includes a plotting implement 10 as described above together with mounting means 16 for mounting the plotting implement 10 and drive means 17 for moving the implement 10 across the light sensitive surface 11. The mounting means 16 may comprise a generally conventional pen holder of the kind used in digital plotters presently used with computers. The plotting apparatus would further include either a power supply line for supplying power to the light source 20 within the implement 10 or a radiation transmitting line such as optic fibre 30 for transmitting radiation from a light source 40 via lens system 43 to the pen holder 16 and plotting implement 10.

The drive means 17 in the case where the plotting apparatus is generally the same as a digital XY plotter may comprise stepping motors in such a plotter. These stepping motors move the plotting implement 10 along the X and Y axes.

The plotting apparatus further includes switching means 41 (FIG. 4) for turning on and off the radiation source or a shutter mechanism 42 (FIG. 5) to occlude the light source 40 so as to expose only those portions of the surface 11 desired to be exposed. When the apparatus is in use the implement 10 is maintained in contact with the radiation sensitive surface 11 at all times. Therefore to enable exposure of the radiation sensitive surface 11 only when desired, the switching means 41 is operative to switch the light source (LED) 20 on and off (FIG. 4) (or open and close the shutter 42 in front of the light source 40 of FIG. 5) in response to a plot signal on line 44. In the case where the plotting apparatus is a generally conventional digital XY plotter, the plot signal may be comprised by the pen down signal used in such conventional apparatus to bring the pen into contact with the drawing surface and lift it from the surface.

Preferably the switching means 41 is further responsive to exposure control means 45 for controlling the intensity of radiation from the radiation source 20 so that during relatively high speed movement of the implement 10, relatively high light intensity is achieved and during relatively low speed movement a lesser intensity is used thereby promoting uniformity of exposure of the radiation sensitive surface 11. The exposure control means 45 comprises switching circuitry responsive to the X and Y stepping signals 46, 47 for the drive motors so that during slow stepping of the motors, corresponding to slow movement of the implement 10, the radiation source 20 is pulsed at a slow rate. The X and Y stepping signals on lines 46, 47 are passed through an OR gate 48 so that the radiation source 20 is pulsed whenever either an X or a Y stepping signal is present. The AND gate 49 ensures that the pen down signal must be present simultaneously with a stepping signal for the light source 20 to be powered.

It will be seen that a constant line width can be maintained regardless of some implement tilting and surface buckling. Also the implement and apparatus is particularly simple to manufacture and use.

Finally it is to be understood that various alterations, modifications and/or additions may be made to the construction and arrangement of parts as herein described without departing from the scope of the present invention as defined in the appended claims.

What I claim is:

1. A plotting implement for creating a record on a surface, the surface being photo-sensitive so that portions of the surface exposed to a predetermined type and amount of light undergo a change thereby creating a record of those exposed portions, the plotting implement including a first light source located within the implement, a contact tip for contacting and for moving between different positions on the surface, the contact tip having a light aperture for passing light therethrough, a light path within the implement for passing light from said first light source to said light aperture, the light path being surrounded by an opaque material, the light aperture having a predetermined width so that the light aperture at the contact tip constitutes a second effective light source which in use is located in contact with the photo-sensitive surface, whereby the second effective light source at the tip exposes portions of the surface which are points and/or lines of contact of the tip with the surface, the exposed portions having the width of the light aperture.

2. A plotting implement as claimed in claim 1 wherein the light source comprises an LED, the LED having a transparent body for passing light from the PN junction of the LED to the aperture, the body tapering from the PN junction towards the tip, the tapering body being surrounded by opaque material and the transparent body being truncated before reaching a point to provide a tip of the transparent body of the predetermined diameter.

3. A plotting apparatus for creating a record on a surface, the surface being photo-sensitive so that portions of the surface exposed to a predetermined type and amount of light undergo a change thereby creating a record of those exposed portions, the plotting apparatus including a plotting implement, the plotting implement including a contact tip for contacting and for moving between different positions on the surface, the contact tip having a light aperture having a predetermined width and for passing light therethrough so as to constitute an effective light source which in use is located in contact with the photo-sensitive surface, whereby the light source at the tip exposes portions of the surface which are points and/or lines of contact of the tip with the surface, the exposed portions having a width of the light aperture; the plotting apparatus comprising a digital XY plotter having a pen holder which in use mounts the plotting implement, the digital XY plotter further including drive means for controlling relative movement of the plotting implement under control of an associated computer and for moving the contact tip to the points and along the lines to be comprised in the record to be produced, the pen holder being normally movable between an operative pen down position and an inoperative pen raised position, movement of the pen holder between the inoperative and operative positions normally occurring in response to a pen down signal, the apparatus further including switching means for selectively discontinuing exposure of the surface to light, the switching means being responsive to the pen down signal to turn on the light source.

* * * * *